(12) United States Patent
Cheng (10) Patent No.: US 7,733,677 B2
(45) Date of Patent: Jun. 8, 2010

(54) OUTPUT POWER SWITCHING VECTOR SCALING SYSTEM AND METHOD

(75) Inventor: Louis Cheng, Richmond Hill (CA)

(73) Assignee: Honeywell International Inc., Morristown, NJ (US)

( * ) Notice: Subject to any disclaimer, the term of this patent is extended or adjusted under 35 U.S.C. 154(b) by 268 days.

(21) Appl. No.: 11/870,911

(22) Filed: Oct. 11, 2007

(65) Prior Publication Data

US 2009/0097288 A1 Apr. 16, 2009

(51) Int. Cl.
*H02M 5/42* (2006.01)
*H02M 7/217* (2006.01)

(52) U.S. Cl. .......................................... 363/84; 363/127

(58) Field of Classification Search ............. 363/15, 363/19, 21.1, 21.11, 50, 55, 56.01, 56.02, 363/56.05, 56.08, 56.11, 56.03, 56.07, 56.1, 363/108, 118, 84, 85, 87, 89, 123, 125, 127, 363/129; 318/438, 717, 729, 803
See application file for complete search history.

(56) References Cited

U.S. PATENT DOCUMENTS

| | | | |
|---|---|---|---|
| 4,984,147 A * | 1/1991 | Araki | ........................... 363/84 |
| 5,298,847 A | 3/1994 | Kerkman | |
| 5,493,195 A | 2/1996 | Heglund et al. | |
| 5,493,201 A | 2/1996 | Baker | |
| 5,585,708 A * | 12/1996 | Richardson et al. | ......... 318/800 |
| 5,905,644 A | 5/1999 | Blasko et al. | |
| 6,583,995 B2 | 6/2003 | Kalman | |
| 6,693,404 B2 * | 2/2004 | Hiraga et al. | ............... 318/729 |
| 6,809,492 B2 * | 10/2004 | Harakawa et al. | ........... 318/609 |
| 6,847,194 B2 * | 1/2005 | Sarlioglu et al. | .............. 322/10 |
| 6,864,660 B2 | 3/2005 | Veltman | |
| 7,116,083 B2 | 10/2006 | Kalman | |
| 7,208,908 B2 | 4/2007 | Anghel | |
| 2001/0009363 A1 | 7/2001 | Rice et al. | |

* cited by examiner

*Primary Examiner*—Adolf Berhane
*Assistant Examiner*—Emily Pham
(74) *Attorney, Agent, or Firm*—Oral Caglar, Esq.

(57) ABSTRACT

A power converter control system and method is provided to maximize the power output of the converter where an overload condition is present. A controller calculates a command voltage and command power factor. The command voltage and command power factor are used to generate a switching vector. Where the voltage associated with a switching vector exceeds an output voltage limit of the converter, a power factor adjustment is generated.

16 Claims, 8 Drawing Sheets

OUTPUT POWER SWITCHING VECTOR SCALING SYSTEM AND METHOD

BACKGROUND OF THE INVENTION

The present invention generally relates to power control systems and methods and more particularly, power converter control systems and methods which may be implemented in an AC-DC power converter to provide a regulated DC voltage from an AC power input in a variety of electric devices.

A converter is a power electronic device that converts an alternating current (AC) input to a regulated direct current (DC) output. Generally, an array of switches connected to various phases of the source current are switched in a pattern that provides segments of the AC currents to form an approximation of the desired direct current. Where the load drawing the direct current is purely resistive, the output current and output voltage remain in phase, each varying proportionally and synchronously to variances in the other. When there is a reactive load, including capacitance or inductance, energy stored by the load creates phase changes between the output current and output voltage as energy stored by the load is returned to the energy source. In order to balance the supplied current and voltage to minimize losses or inefficiencies inherent in these phase changes, the output current and output voltage may be measured and the measurements provided as feedback to a converter controller, which then alters the converter switching pattern and currents accordingly.

Figure 1:
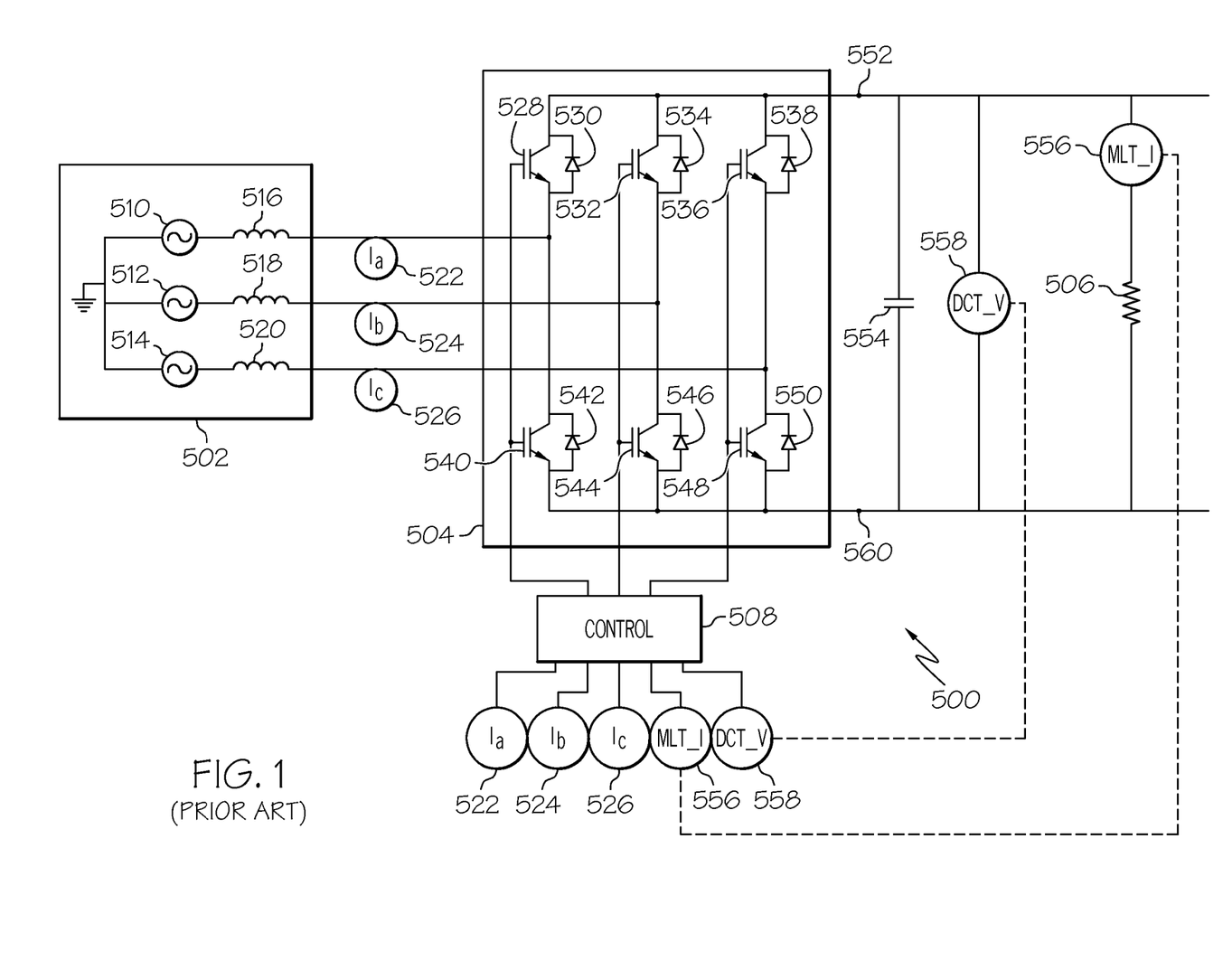
FIG. 1 is a schematic diagram depicting a prior art power converter system.

With reference to FIG. 1, a circuit diagram of a conventional power converter system 500 including a converter 504 is shown. An AC generator 502 provides energy at several phases to a converter 504. The converter 504 receives control signals from a controller 508 to supply regulated DC energy to a load 506.

The AC generator 502 may be a three-phase voltage source represented as three AC voltage generators 510, 512 and 514 having three different phases. The impedances of the generators 510, 512 and 514 may be characterized by associated source impedances 516, 518 and 520, respectively. Three currents 522, 524 and 526 may be measured and provided to the converter controller 508. The first current 522 is connected to AC generator 502 through a pair of switches 528 and 540 of opposite polarity. The second current 524 is connected to AC generator 502 through a second pair of oppositely polarized switches 532 and 544. The third current 526 is connected to AC generator 502 through a third pair of switches 536 and 548 with opposite polarity. By connecting each current to a pair of oppositely polarized switches, currents with six different phases are potentially combined to form the regulated DC output.

Converter 504 may be a typical three-phase converter including six switching devices 528, 532, 536, 540, 544 and 548 with associated anti-parallel diodes 530, 534, 538, 542, 546 and 550, respectively. The output terminals 552 and 560 of the converter 504 may be connected to a DC link capacitor 554 and the DC load 506. The output voltage 556 across the DC load 506 and the output current 558 may be provided as feedback to the converter controller 508. The converter controller 508 processes the currents 522, 524, 526, the output current 558 and the output voltage 556 to generate switching vectors Vt used to determine the duty cycle and pulse width of the switching pulses and generate a gating pattern of control signals that operate the switching devices 528, 532, 536, 540, 544 and 548. By changing the gating pattern, the converter controller 508 causes the phase angle and magnitude of the output current 558 to be varied and thereby regulate the DC output voltage 556 across the output terminals 552, 560 of converter 504.

The converter controller 508 may receive measures of the output current magnitude 558 and output voltage 556 and generate a switching vector 50 at a voltage Vt. In principle, the output current 558 may be increased as the DC load 506 becomes larger.

The converter controller 508 provides control signals to the converter 504 and may regulate the output voltage 556 by turning on/off the switching devices 528, 532, 536, 540, 544 and 548 of the converter 504. The converter controller 508 may cause the switches 528, 532, 536, 540, 544, 548 to pass a train of pulses having determined pulse widths at the output terminals 552, 560. The fundamental voltage component of these pulses may have the same frequency as that of the AC generator 502 but at a different angle and magnitude. The converter controller 508 may provide control signals to alter the train of pulses and thereby modify the power factor of the resulting output current 558 and output voltage 556 and may vary the magnitude of the fundamental voltage component of the output voltage 556 across the converter terminals 552, 560.

When the magnitude of the terminal voltage 556 becomes too low, switching vector voltages Vt required from the converter may exceed the DC bus voltage limit Vdc. When the voltage Vt of a switching vector 50 exceeds the DC bus voltage limit Vdc, the switching vector 50 is scaled by reducing the output current 558 accordingly and the terminal voltage 556 may be reduced. When the terminal voltage 556 is reduced by decreasing the output current 558, the ability of the controller 508 to simultaneously regulate the magnitude of the AC currents 552, 524 and 526 and the resulting power factor 227 may be compromised. As such, the converter 504 may be unable to adequately regulate the terminal voltage 556.

Figure 2:
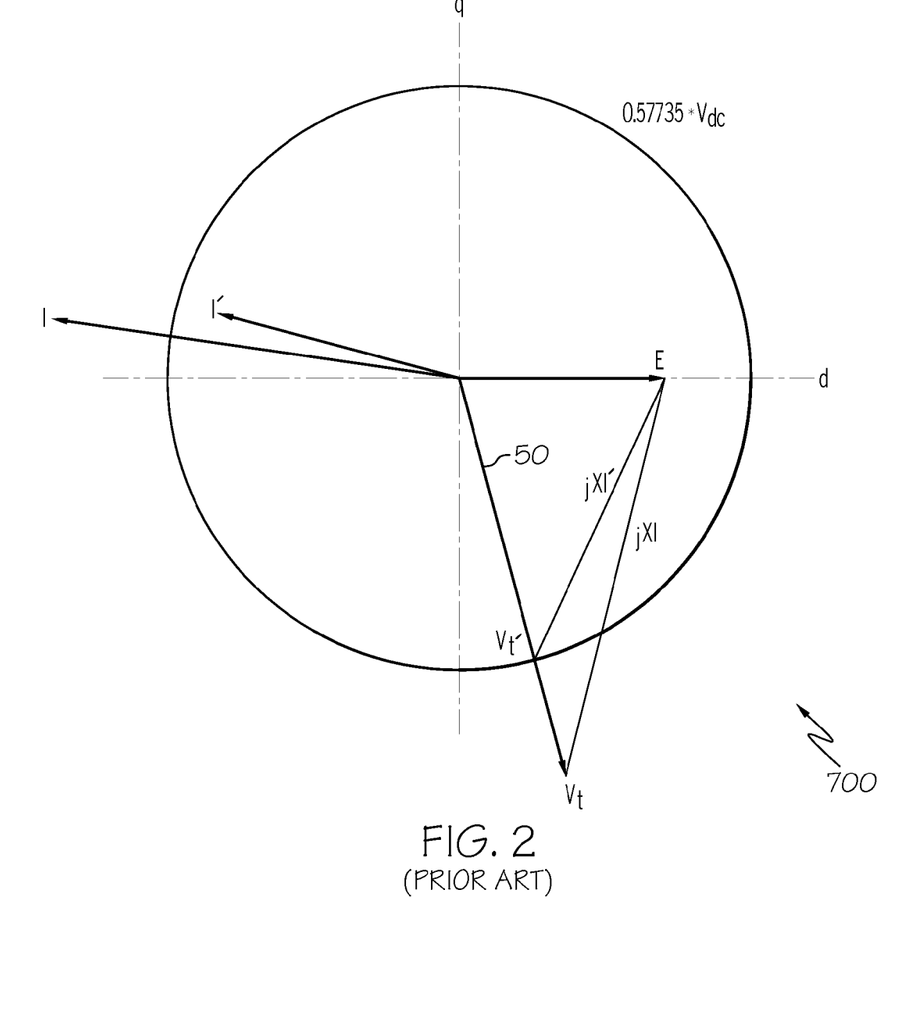
FIG. 2 is a graph of the voltage and current outputs of a prior art converter.

With reference to FIG. 2, a phase graph 700 of the current and voltage outputs of a typical converter is shown. The phase graph 700 is plotted on the d and q axis. E represents the back EMF. Vt represents the terminal voltage. I represents the AC current. X represents the source impedance. Vdc represents the DC link voltage of the converter. I' represents the corrected current. Vt' represents the corrected voltage. 0.57735*Vdc represents the maximum ac voltage of the converter 504.

Generating the current I requires the converter to provide a terminal voltage Vt, which exceeds the maximum output voltage of the converter 504. Conventionally, the converter control 508 provides control signals that scale the switching vector 50 from a value Vt to a value Vt' according to the equation:

$$Vt' = (0.57735 * Vdc)/Mag(Vt) * Vt$$

The vector Vt' generates a voltage drop across the source impedance X of jXI' instead of jXI. The current vector I' is smaller than the current vector I and the output power is correspondingly lowered.

As can be seen, there is a need for a converter control system capable of effectively maintaining a terminal voltage with a switching vector having a voltage below the DC bus voltage limit Vdc while providing maximal power and power factor control.

SUMMARY OF THE INVENTION

A converter control system comprises a current magnitude determination module, a power factor correction module and a power factor adjustment module. The current magnitude determination module and the power factor correction module generate a switching vector having a voltage magnitude. The power factor adjustment module generates an angle adjustment signal when the voltage magnitude exceeds a voltage limit. A power converter comprises an AC power source, a converter receiving power from the AC power source and generating a regulated DC voltage and a control module providing control signals to the converter. The control module provides control signals to the converter to change the power factor of the regulated DC voltage when the converter experiences an overload condition.

A method of controlling a power converter comprises receiving an output voltage, receiving an output current, calculating a command current, calculating a command power factor, generating a switching vector, determining if the switching vector creates an overload condition, calculating an angle adjustment when there is an overload condition and calculating a second command power factor using the angle adjustment.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

A converter control system in accordance with an embodiment of the invention may be implemented in an AC-DC power converter to provide a regulated DC voltage from an AC power input in a variety of electric devices, including voltage regulators and motor drives.

The converter control system includes a current magnitude determination module, power factor correction module and power factor adjustment module to calculate switching vector modifications during overload conditions that increase the current and change the power factor to provide correction voltages at the limit of the voltage set-point.

Figure 3:
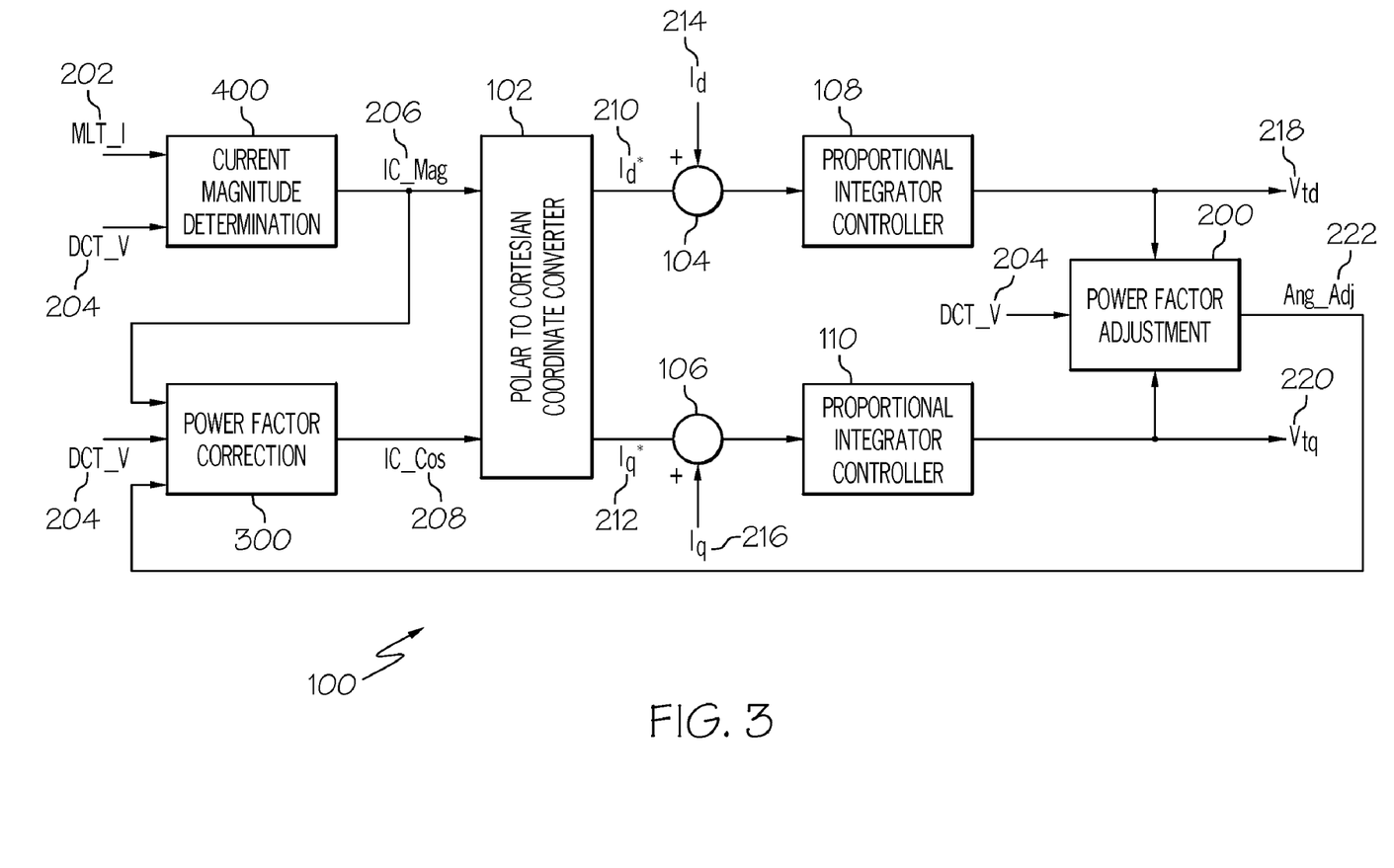
FIG. 3 is a block diagram depicting a converter controller in accordance with an aspect of the invention.

With reference to FIG. 3, a block diagram of a converter controller 100 in accordance with an aspect of the invention is shown. The controller 100 may include an AC current magnitude determination module 400. The AC current magnitude determination module 400 may receive the output current 202 (MLT_I) and the output voltage 204 (DCT_V) and may determine the appropriate AC current magnitude modification necessary to provide the desired output voltage 204. A current magnitude signal 206 (IC_Mag) may be output by the AC current magnitude determination module 400. The current magnitude signal 206 may be fed to a power factor correction module 300 along with the output voltage 204 and feedback representing a calculated angle adjustment 222 (Ang_Adj) when an overload condition exists. The power factor correction module 300 may generate a current phase signal 208 (IC_cos) necessary to provide the output voltage 204. The current magnitude signal 206 and the current phase signal 208 may be provided to a coordinate conversion module 102. The coordinate conversion module 102 may convert the current command signals 206, 208, expressed in polar coordinates, into current command signals 210 (Id*) and 212 (Iq*) expressed in Cartesian coordinates.

The current command signal 210 may be compared to current command signals 214 (Id) at addition module 104 and the current command signal 212 may be compared to current command signal 216 (Iq) to generate correction signals in each dimension. Proportional integrator controllers 108 and 110 may process the resulting currents to generate a switching vector 70 with a value Vt (shown in FIG. 7). Component values Vtd, Vtq are used to determine the duty cycle and pulse width of the switching pulses. A power factor correction module 200 may receive the switching vector values 218 (Vtd) and 220 (Vtq) and may generate the angle adjustment value 222 with reference to the output voltage 204. This angle adjustment value 222 may be fed back to the power correction module 300.

Figure 4:
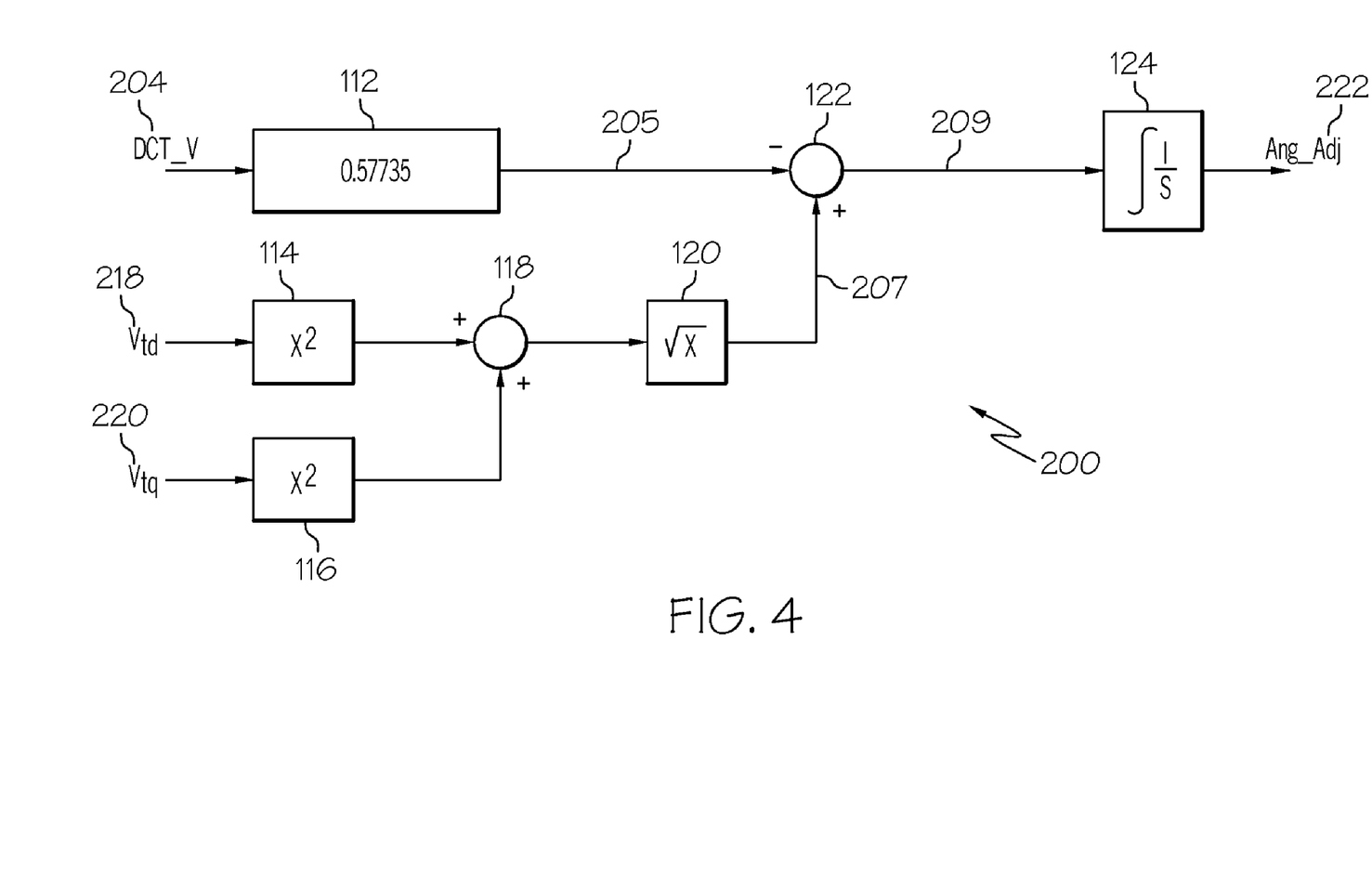
FIG. 4 is a block diagram depicting a power factor adjustment module in accordance with an aspect of the invention.

With reference to FIG. 4, a block diagram of a power factor adjustment module 200 in accordance with one embodiment of the invention is shown. The dc bus voltage 204 may be converted to phase voltage 205 by conversion module 112, multiplying the dc bus voltage by 0.57735 is the maximum phase voltage. The magnitude of a phase adjuster 207 is the square root of the sum of the squaring modules 114 and 116 of the components values 218 (Vtd), 220 (Vtq). The squares of the voltage scaling vector components values, Vtd^2 and Vtq^2, may be summed at adder 118. The root of the sum of the squared voltage scaling vector components values (a root value 207) may be generated with a square root module 120. The phase voltage value 205 may be subtracted from the root value 207 using addition module 122. If the root value 207 exceeds the maximum phase voltage value 205, the difference 209 may be processed by integrator 124 to generate the phase angle adjustment value 222. If the root value 207 does not exceed the phase voltage value 205, then no correction value may be generated and the phase angle adjustment value 22 (Ang_Adj)=0. The phase angle adjustment value 222 may be fed back to the power factor control module 300.

Figure 5:
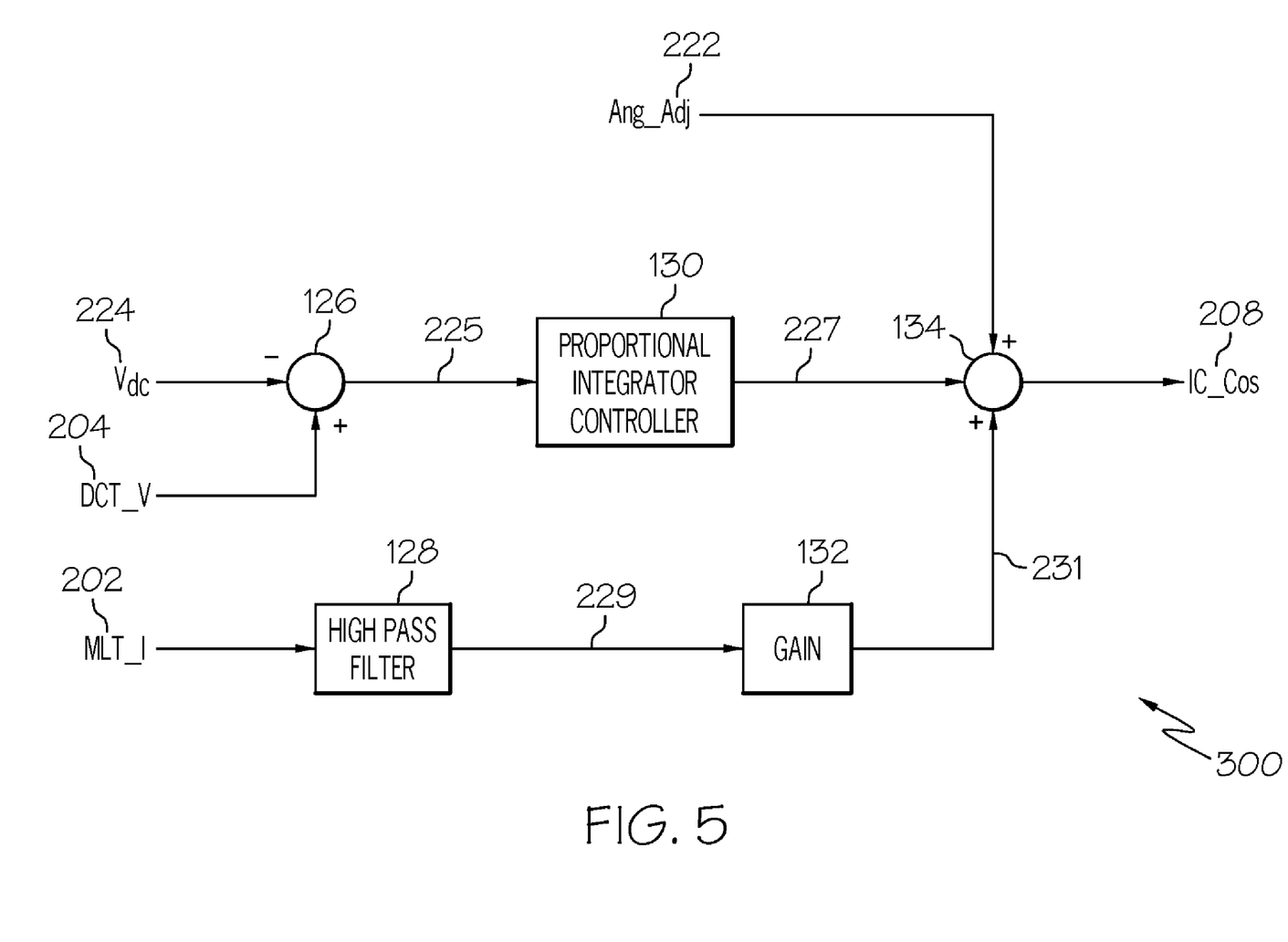
FIG. 5 is a block diagram depicting a power factor correction module in accordance with an aspect of the invention.

With reference to FIG. 5, a block diagram of a power factor control module 300 in accordance with one embodiment of the invention is shown. The voltage setpoint 224 (Vdc) may be subtracted from the output voltage 204 at addition module 126 to generate a error factor 225. The error factor 225 may be processed by a proportional integrator controller 130 to generate a power factor reference 227 (PFR). The output current 202 may be passed through a high-pass filter 128 to extract a high frequency component 229 of the current. The high frequency component 229 may then be processed by a gain controller 132 to scale the fine-tune component of the power factor angle. The power factor reference and the scaled fine-tune component 231 may be added at addition module 134 to generate the phase angle vector 208 (IC_cos). Where the converter has been overloaded, the angle adjustment factor 222 may be added to the phase angle vector (comprised of power factor reference 227 and the scaled fine-tune component 231).

Figure 6:
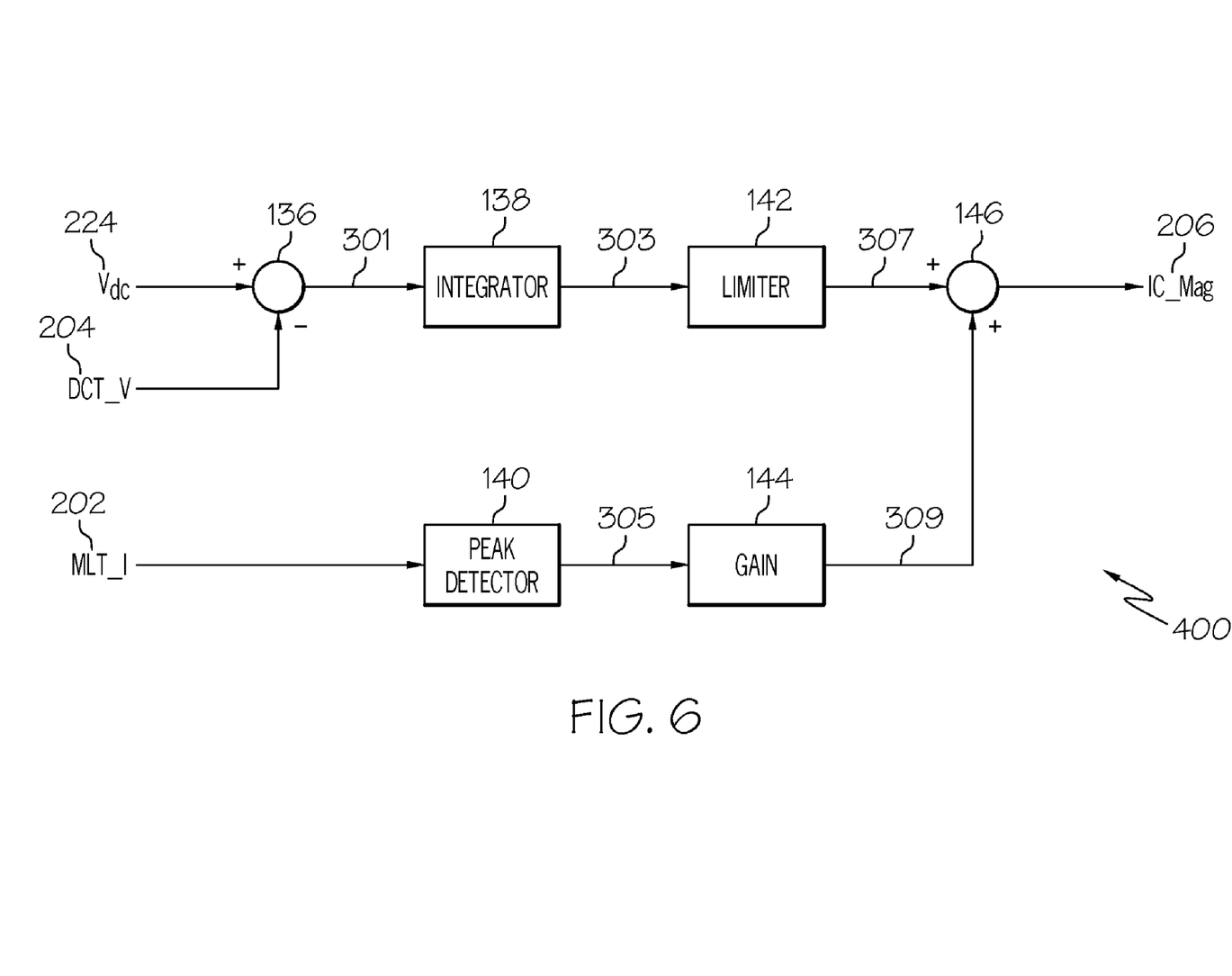
FIG. 6 is a block diagram depicting a current magnitude determination module in accordance with an aspect of the invention.

With reference to FIG. 6, a block diagram of a current magnitude determination control module 400 in accordance with an object of the invention. The voltage setpoint 224 may be compared to the output voltage 204 by subtracting the output voltage 204 from the voltage setpoint 224 using an addition module 136 to generate an error voltage signal 301. The error voltage 301 may then be processed by an integrator 138 to generate a current correction factor 303. This current correction factor 303 may then be passed through a limiter 142. The output current 202 may be passed through a peak detector 140 and the result 305 may then be amplified by a gain module 144. The result from the limiter 142 (limiter result 307) and the gain module 144 (gain module result 309) may be added using adder 146 to generate a current magnitude 206.

Figure 7:
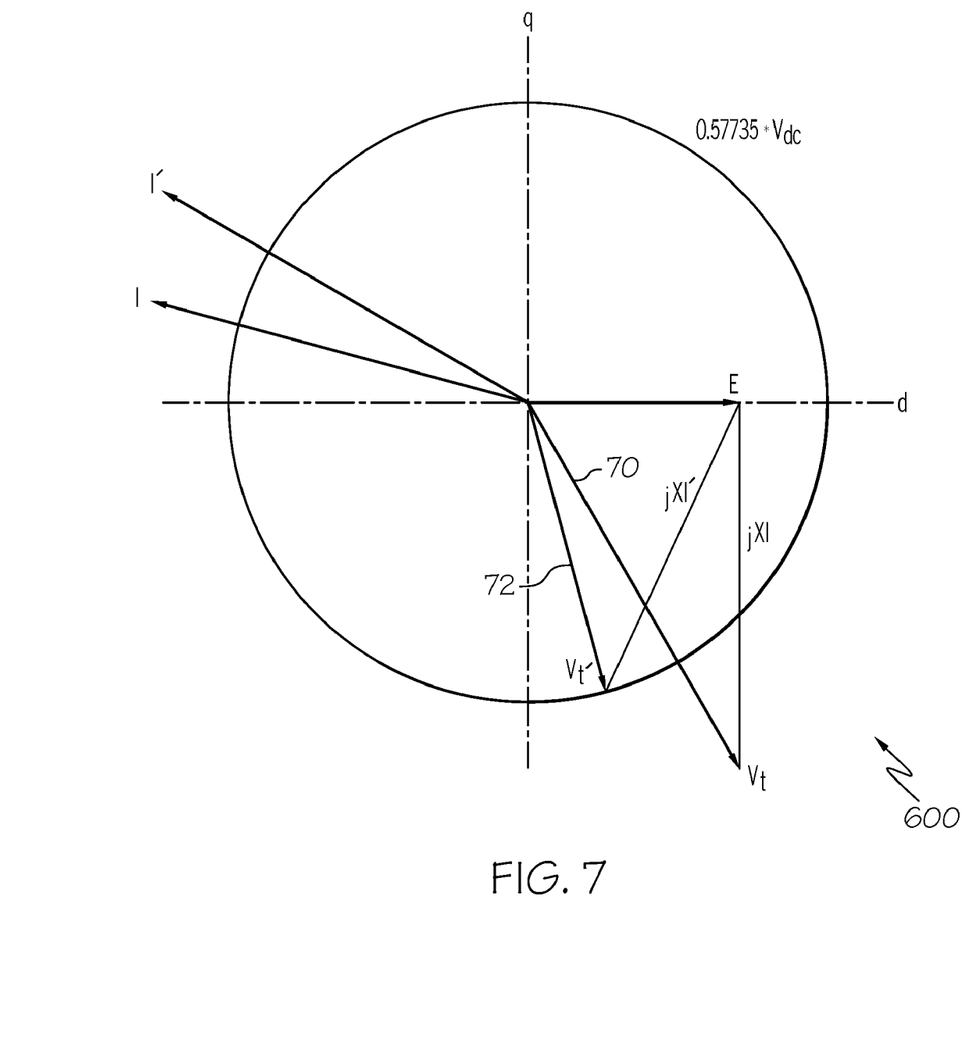
FIG. 7 is a graph of the voltage and current outputs of a converter in accordance with an aspect of the invention.

With reference to FIG. 7, a phase graph 600 of the current and voltage outputs of a typical converter is shown. The phase graph 600 is plotted on the d and q axis. E represents the back EMF. Vt represents the terminal voltage. I represents the AC current. X represents the source impedance. Vdc represents the DC link voltage of the converter. I' represents the corrected current. Vt' represents the corrected voltage. 0.57735*Vdc represents the maximum output voltage of the converter 504.

Generating the current I may require the converter to provide a terminal voltage Vt, which exceeds the maximum output voltage of the converter 504. During this overload condition, the error between Vt and the maximum converter output 0.57735*Vdc may be used to scale back the phase of the command current to generate I' The scaling vector generating command current I' may generate a switching vector 72 with a value Vt', at the maximum converter output level.

This scaling method may maximize the power output by the converter. Although the scaled vector 72 with a value Vt' may be smaller than the desired vector 70 with a value Vt, the controls may remain active and the voltage control loop may transition seamlessly to current control.

Figure 8:
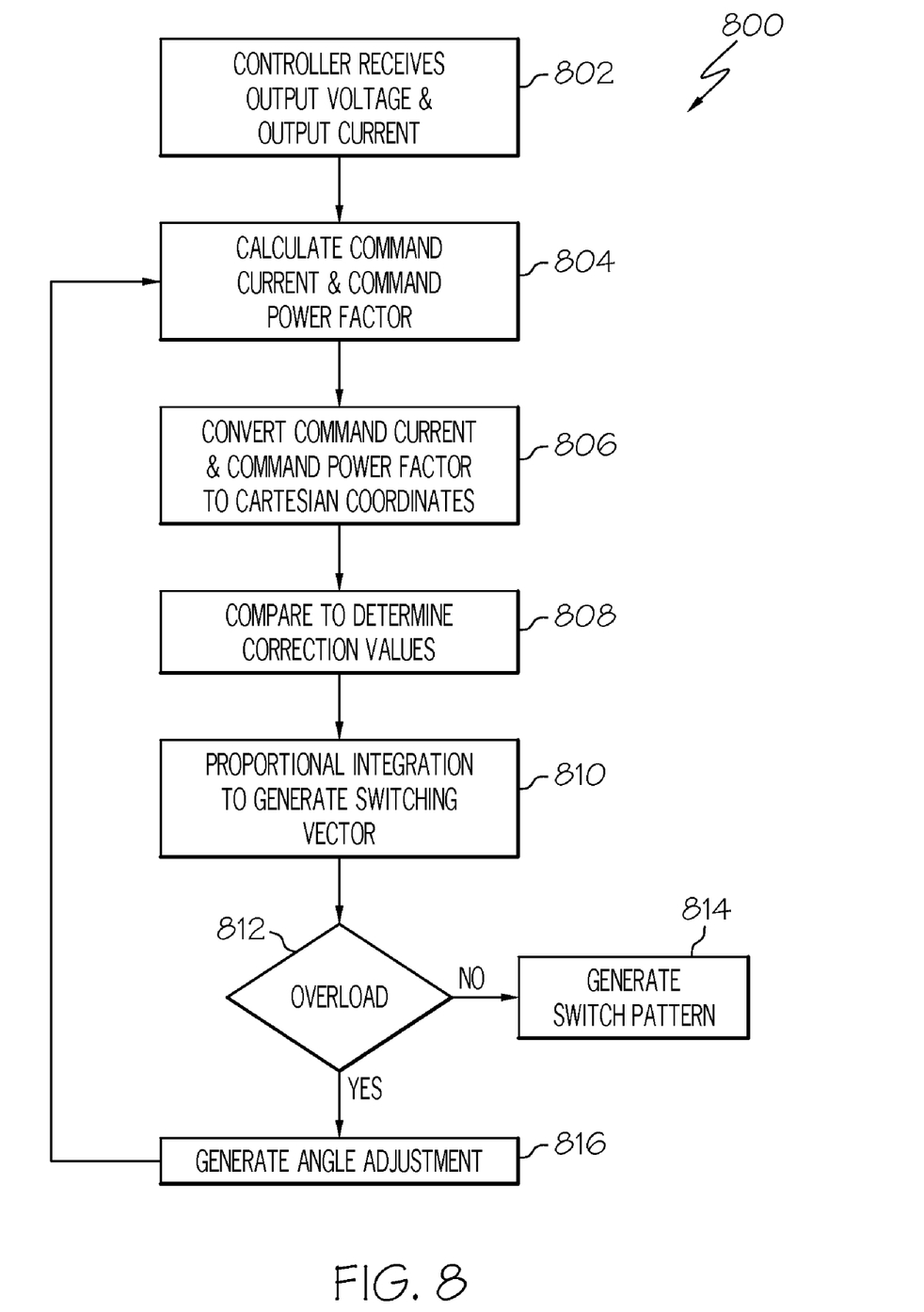
FIG. 8 is a flow chart depicting a process of controlling a power converter, in accordance with an aspect of the invention.

With reference to FIG. 8, a flow diagram of an overload control process 800 is shown. A converter controller 100 may receive an output voltage 204 and an output current 202 at function block 802. The converter controller 100 may calculate a command current 206 and a command power factor 208 at function block 804. The command current 206 and command power factor 208 may be converted to Cartesian coordinates at function block 806. The converted values may be compared with existing values to determine correction values at function block 808. The correction values may be proportionally integrated at function block 810 to generate a switching vector. The switching vector may be compared to a converter limit to determine an overload condition at decision block 812.

If there is no overload condition, the process may follow the NO path and the converter controller 100 may generate a switching pattern at function block 814. If there is an overload condition, the process may follow the YES path and generate an angle adjustment at function block 816. The angle adjustment may be fed back to the command power factor calculation at function block 804.

It should be understood, of course, that the foregoing relates to exemplary embodiments of the invention and that modifications may be made without departing from the spirit and scope of the invention as set forth in the following claims.

I claim:
1. A converter control system comprising:
a current magnitude determination module connected to receive an output current value and a desired output voltage value and provide a current magnitude signal;
a power factor correction module connected to receive the current magnitude signal and a phase angle adjustment value and to produce a current phase signal; and
a power factor adjustment module comprising;
a conversion module for converting the desired output voltage value to a maximum phase voltage value;
a first squaring module connected to receive a value of a first component (Vtd) of a switching vector and square said value;
a second squaring module connected to receive a value of a second component (Vtq) of the switching vector and square said value;
an adder to sum squared values from the first and second squaring modules;
a square root module for generating a root value of summed square values from the adder;
an addition module to sum the maximum phase voltage value and the root value to produce a difference value;
an integrator to process the difference value and to generate a phase angle adjustment value for feedback to the power factor control module; and
wherein the power factor is adjusted responsively to a condition in which a desired terminal voltage magnitude exceeds a voltage limit of the converter capability.

2. The converter control system of claim 1, further comprising a coordinate conversion module receiving the current control magnitude signal and the power factor signal and converting the current control magnitude signal and the power factor signal to equivalent signals in Cartesian coordinates.

3. The converter control system of claim 2, further comprising proportional integrators receiving the Cartesian coordinate signals and generating the switching vector.

4. A power converter comprising:
a converter receiving power from an AC power source and generating a regulated DC voltage; and
a control module providing control signals to the converter, the control module comprising;
a power factor correction module which comprises;
a proportional integrator controller for producing a reference power factor;
a high pass filter for extracting a high-frequency component of desired output current value and producing a high frequency component value;
a gain controller for receiving the high frequency component value and producing a scaled fine-tune component; and
an addition module for summing an angle adjustment factor and the scaled fine-tune component to produce a phase angle vector; and
wherein the control module provides control signals to the converter to change a power factor of the regulated DC voltage when the converter experiences an overload condition.

5. The power converter of claim 4, wherein the control module further comprises a current magnitude determination module.

6. The power converter of claim 5, wherein the current magnitude determination module receives a converter output voltage and a converter output current and generates a current command magnitude signal.

7. The power converter of claim 4, wherein the control module provides control signals to the converter to generate a switching vector.

8. The power converter of claim 7, wherein the overload condition exists when the switching vector represents a voltage exceeding a voltage limit.

9. The power converter of claim 8 wherein the power factor is changed so that the voltage represented by the switching vector is equal to the voltage limit.

10. The power converter of claim 4, wherein the power factor correction module receives a current command magnitude signal and a converter output voltage to generate a current command power factor signal.

11. The power converter of claim 10, wherein the power factor correction module receives an angle adjustment signal when the converter experiences an overload condition.

12. The power converter of claim 4, wherein the control module further comprises a power factor adjustment module.

13. A method of controlling a power converter comprising:
receiving an output voltage;
receiving an output current;
calculating a command current;
calculating a command power factor;
generating a switching vector;
determining if the switching vector creates an overload condition;
calculating an angle adjustment when there is an overload condition;
calculating a second command power factor using the angle adjustment; and
wherein the step of calculating an angle adjustment comprises;
converting a desired output voltage value to a maximum phase voltage value;
squaring a value of a first component (Vtd) of a switching vector;
squaring a value of a second component (Vtq) of the switching vector;
summing the squared values;
generating a root value of the summed square values;
summing a maximum phase voltage value and the root value to produce a difference value; and
processing the difference value to generate a phase angle adjustment value for feedback to a power factor control module so that the step of calculating the second command power factor may be performed.

14. The method of claim 13 wherein the angle adjustment provides a second switching vector representing a voltage equal to the voltage limit.

15. The method of claim 13, further comprising converting the command voltage and the command power factor to Cartesian coordinates.

16. The method of claim 15 wherein the switching vector is generated by proportional integration.

* * * * *